J. Kedzie

Water Filter.

No. 1,664. Reissued May 10, 1864.

Witnesses:
R. F. Osgood.
W. H. Forder.

Inventor:
John Kedzie

N. PETERS, PHOTO-LITHOGRAPHER, WASHINGTON, D. C.

UNITED STATES PATENT OFFICE.

JOHN KEDZIE, OF ROCHESTER, NEW YORK.

IMPROVEMENT IN FILTERS.

Specification forming part of Letters Patent No. 10,420, dated January 10, 1854; Reissue No. 1,498, dated June 16, 1863; Reissue No. 1,664, dated May 10, 1864.

*To all whom it may concern:*

Be it known that I, JOHN KEDZIE, of Rochester, in the county of Monroe and State of New York, did invent a new and useful Improvement in Filters, for which Letters Patent of the United States were granted to me on the 10th day of January, 1854, and reissued on the 16th day of June, 1863; and I do hereby declare that the following is a full and exact description thereof, reference being had to the accompanying drawings, making part of this specification.

Figure 2:
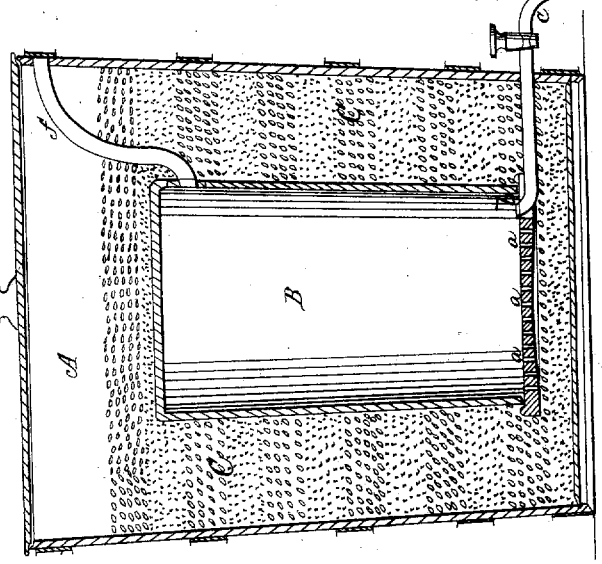
Figure 3:
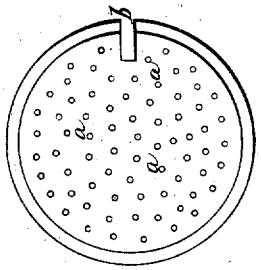
Figure 1:
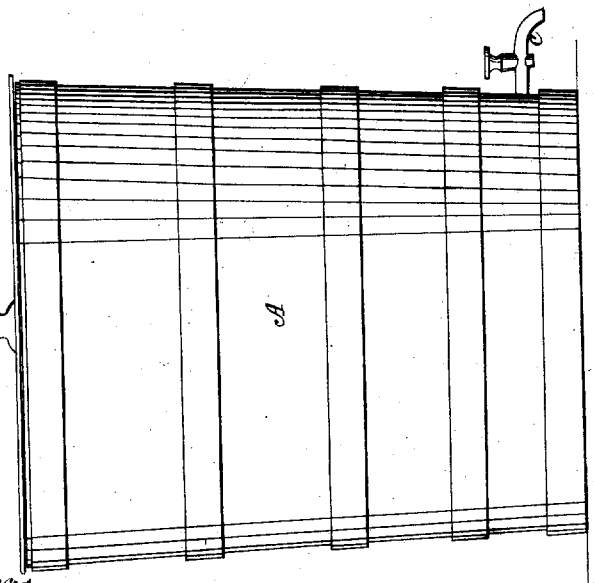

Figure 1 is an elevation of my improved filter; Fig. 2, a central vertical section thereof; Fig. 3, a plan of the bottom of the crock when the latter is made in two parts.

Like letters of reference indicate corresponding parts in all the figures.

My improved filter is of that class designed for household and similar use, in which an outer tub or receptacle containing proper filtering material is employed, having within the latter a suitable crock or vessel that receives the water after it has passed through the filtering material, and from which crock it is drawn by means of a cock or other convenient means. Filters for similar use having porous stone through which the water is forced by pressure or otherwise have been known in England for many years. There are many obvious objections to these, not the least of which are their great cost and the difficulty of transportation. To obviate these objections a porous packing has been substituted, consisting of charcoal, gravel, or similar materials. Where such is employed of course it is necessary that some inner or inclosed crock or vessel be used to collect the water so that it may be drawn off. In my first experiments this inclosed crock or vessel was simply an earthern one, inverted or turned bottom upward, so that its whole bottom or lower end was entirely open, while an escape-pipe was secured to its top, passing upward and outward, free of the packing, for the escape of imprisoned air. In practical operation I found that this device was inoperative for the reason that the open bottom not only allowed a gradual deposit of the packing therein by the entrance of the water, but more especially from the fact that when thus arranged the packed filter could not be transported even for a short distance without the crocks becoming filled, or partially so, by the packing working therein by the jar and the inclination of the filter in carrying so as to be practically useless, necessitating the repacking of the filter on reaching its destination. To remedy this difficulty I formed the crock with a closed bottom, so as to exclude the packing therefrom, and pierced the crock at a proper position with numerous fine holes to admit the water; and my invention consists in a crock thus constructed, used in combination with the packing and tub, thus producing a filter which is perfect in its action, and which can be transported any distance with proper care without disarranging any part or requiring repacking.

As represented in the drawings, A is the ordinary outer tub or receptable; B, the crock and C the packing, composed of alternate layers of gravel and charcoal, or of any other suitable material. The lower end or base of the crock is closed by some suitable means so as to prevent the packing entering, that represented in the drawings being a bottom, D, which is detached, or may form a part of the crock itself. A similar effect will be produced if an open-bottomed crock is allowed to rest directly on the bottom or base of the outer tub or receptacle, with the packing only around its sides. At a suitable position, either at the bottom or sides of the crock, or both, small perforations, *a a a* or equivalent, are made, which allow the filtered water to pass therein, but so small as to effectually exclude the packing. At a suitable position also, a pipe, *e*, connects with the crock and passes outward through the packing, and the outer tub or receptacle having outside a suitable crock, or equivalent, for drawing off the water. The upper end or portion of the crock connects with the outer air either outside of the tub or above the packing in such a manner as to allow the imprisoned air to escape from the crock as the water is admitted, or, vice versa, to allow the air to enter when the water is drawn off. In the drawings the means employed is represented as a pipe, *f*, extending from the crock, through the packing, to the outside of the tub. It is obvious that the same effect would be produced were the top of the crock open, extending above the top of the packing.

Among the advantages of this arrangement are the following:

First, and most important, by closing the bottom of the crock I am enabled to effectually exclude the packing from entering, either by the deposit with the water or by the jar or the inclination of the filter in transporting. I thus enable the filter to be easily and safely transported, and avoid the necessity of repacking, which cannot be the case if the bottom is left open. The crock also retains its proper upright position in carrying better than if its bottom is left open.

Second, the perforations *a a*, or equivalent, serve as a sort of secondary filter, by admitting the water without impurities. Where the bottom of the crock is left open, these perforations are not used, and consequently the water is not so well strained, as it has a freer access. The employment of these perforations is a consequence of closing the bottom of the crock.

Third, I obtain the benefit of a greater degree of filtration than in ordinary devices; or, in other words, the benefit of a greater distance of the passage of the water through the packing. It may be made to pass nearly or quite the whole depth of the packing before it enters the crock.

Fourth, the packing insulates the crock in such a manner as to keep it cool in summer—the effect being produced not only by the thickness of the packing itself, but also by the evaporation of water that rests near the sides of the tub outside the crock. This has a tendency to withdraw heat from the crock and keep the water at that point cool. I consider this effect of great consequence, and it can be produced only where the crock is surrounded at its sides by the packing. I am not aware that a device combining this effect with the others before mentioned was known prior to my invention.

The form and construction of this filter is such that it is more portable than ordinary devices, there being no projecting parts that can be easily broken. Many filters are objectionable on this account. The expense of partitions for dividing the filtered water from the packing, and for separating the layers of packing from each other, as in many English filters, is avoided.

I am aware that filters were known prior to my invention, in which the water passed through packing to purify it; but such I do not broadly claim.

What I claim as my invention, and desire to secure by Letters Patent, is—

An inner crock or vessel, B, having its bottom or base closed, but admitting water by means of perforations *a a*, or in some equivalent manner, and provided with an eduction-outlet, *c*, when the same is used in combination with packing C and an outer tub or receptacle, A, substantially as herein specified.

In witness whereof I have hereunto signed my name in the presence of two subscribing witnesses.

JOHN KEDZIE.

Witnesses:
R. F. OSGOOD,
JAY HYATT.